Figure 1:
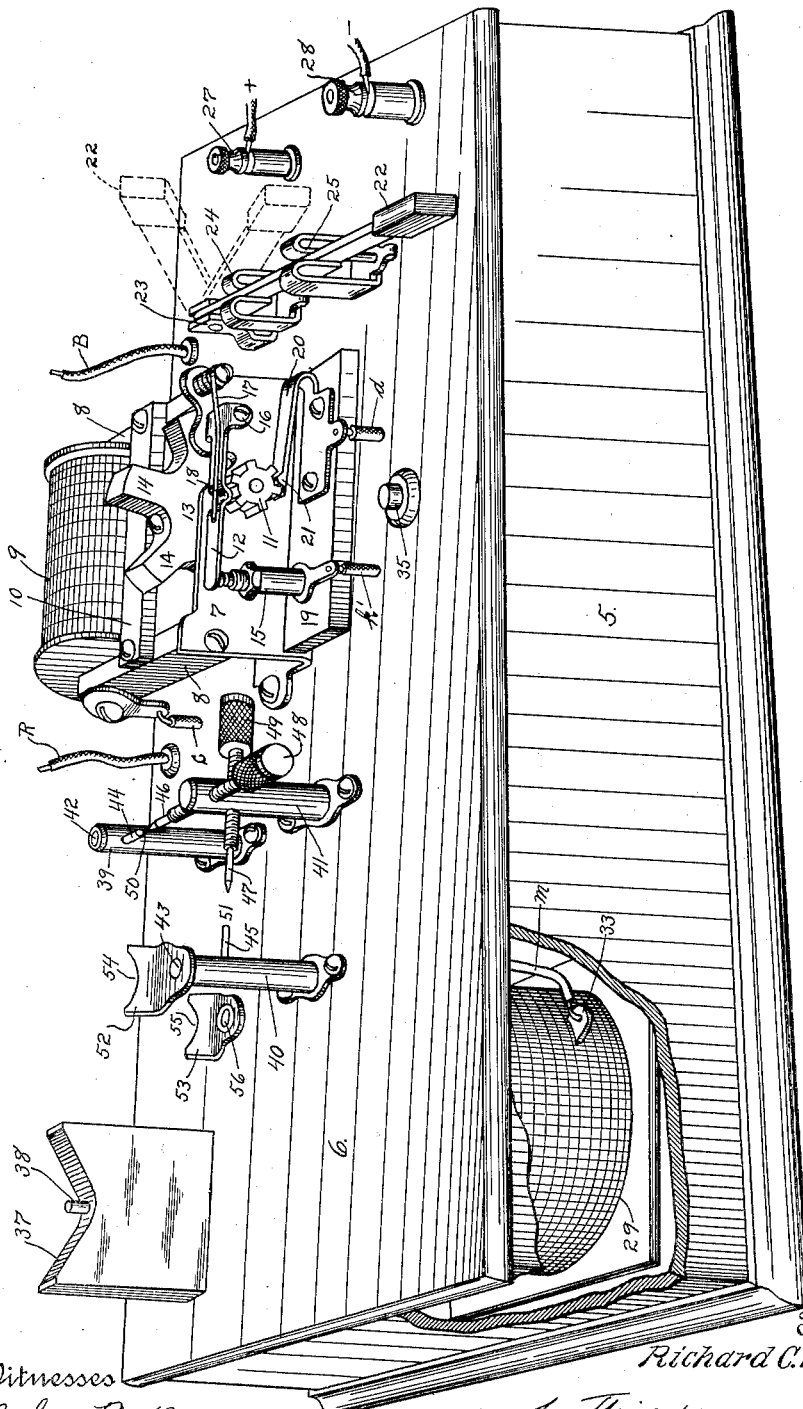

R. C. BIERBOWER.
ELECTRICAL TESTING DEVICE.
APPLICATION FILED OCT 2, 1919.

1,349,656.

Patented Aug. 17, 1920.
2 SHEETS—SHEET 1.

Witnesses
John B. Wade.

Inventor
Richard C. Bierbower.
by Wilkinson & Ginsta
his Attorneys

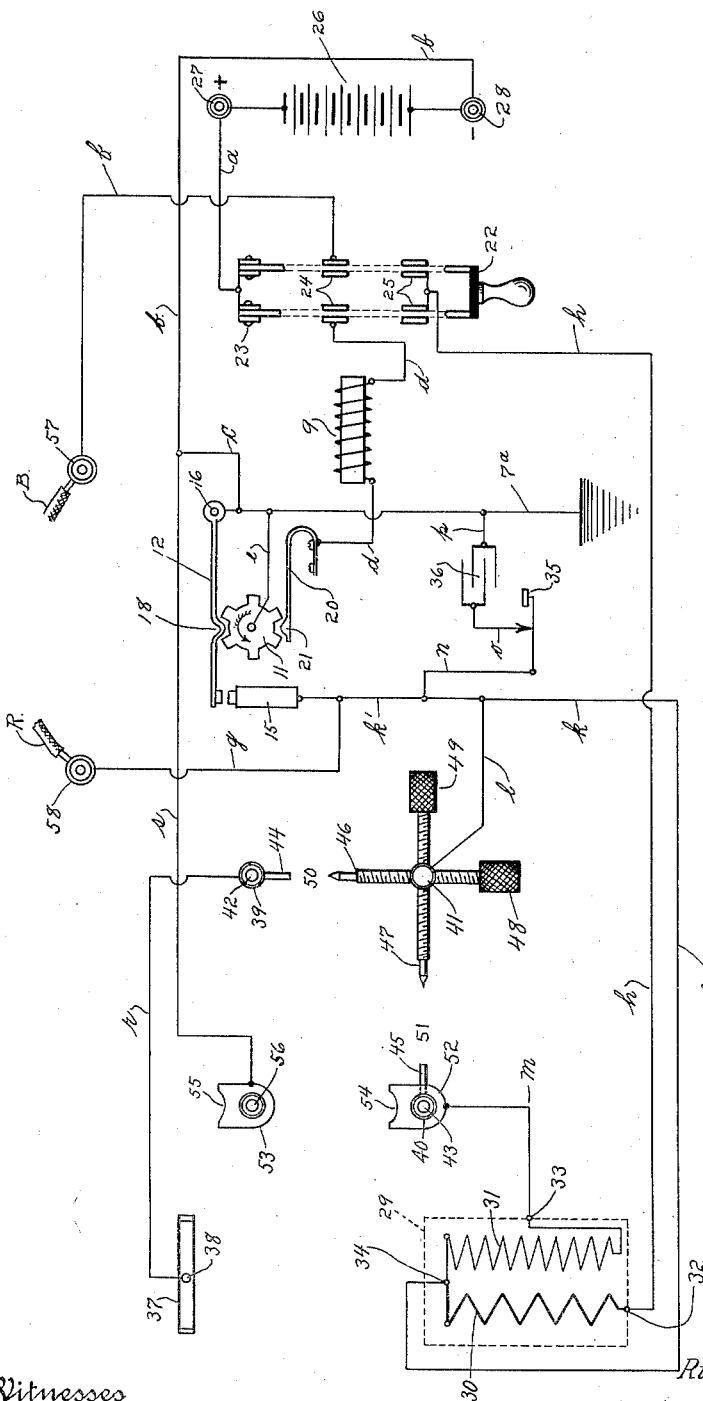

UNITED STATES PATENT OFFICE.

RICHARD C. BIERBOWER, OF SAN ANTONIO, TEXAS, ASSIGNOR TO TESTALL ELECTRIC MANUFACTURING CO., OF SAN ANTONIO, TEXAS, A CORPORATION OF TEXAS.

ELECTRICAL TESTING DEVICE.

1,349,656.    Specification of Letters Patent.    Patented Aug. 17, 1920.

Application filed October 2, 1919. Serial No. 327,923.

*To all whom it may concern:*

Be it known that I, RICHARD C. BIERBOWER, a citizen of the United States, residing at the city of San Antonio, county of Bexar, and State of Texas, have invented certain new and useful Improvements in Electrical Testing Devices; and I do hereby declare the following to be a full, clear, and exact description of the invention, such as will enable others skilled in the art to which it appertains to make and use the same.

This invention relates to improvements in electrical testing devices, and broadly embodies a plurality of definite electrical circuits, including devices controlled thereby, in conjunction with certain contact making and indicating elements, the several circuits and elements being so correlatively associated, in novelly combined arrangement, that defective insulation, breaks or other faults may readily be detected in electrical wiring, equipment, apparatus, appliances and electrical devices generally, or the parts thereof, when properly coupled up in circuit with the improved testing device.

The primary object of the invention is to provide means of this character, adapted for a maximum number of tests, which testing device is not only of compact and durable structure, but which is also simple and effective in action, as well as comparatively inexpensive to manufacture, and hence marketable to a greater number of prospective individual users who need not necessarily be skilled electricians.

Other objects and advantages of the invention will be so clearly apparent, as incidental to the following disclosure, that it would only be undesirable surplusage to further refer to the same initially, and with these general prefacing remarks reference will now be had to the accompanying drawings illustrating a practical embodiment of the improvements, in which drawings—

Figure 1 is a perspective view of the testing device as assembled, a detachable high tension testing cable being omitted, and certain parts being broken away for convenience of illustration; and Fig. 2 is a diagrammatic view of the electrical circuits and coöperating elements, the parts shown conventionally in this view being indicated, where feasible, by the same reference characters as in Fig. 1.

5 designates a box having a lid 6, and on top of this lid various elements are suitably mounted, while the bottom thereof suspends a high tension spark coil, a condenser and most of the wiring of the testing device in protected or housed relation within the box body.

A non-magnetic metallic angle plate, having a vertical web 7, is secured to the top of the lid, and soft iron magnet bars 8 are projected rearwardly from the upper ends of said vertical web to support the core and coil of an electro-magnet 9 in substantially spaced relation to said vertical web.

A non-magnetic metal bar 10 spans the tops of the bars 8, intermediate of the ends thereof, and is provided with a depending lug (not shown) apertured to journal one end of an arbor, the other end of which latter projects through said vertical supporting web 7 of the angle plate, in journaled relation thereto, and carries a toothed or star wheel 11, functioning somewhat like a commutator element but more especially serving as a mechanical means for vibrating an electro-mechanical circuit interrupter bar 12, all of which will later be more fully referred to.

13 designates a soft iron rotor, having peripheral radial lugs 14, mounted on the aforesaid arbor within the space encompassed by the said non-magnetic angle plate, the bar 10 and the magnet bars 8, which latter bars constitute the poles of the electromagnet 9 and coöperate with the peripheral radial lugs 14 to rapidly rotate said soft iron rotor 13 when the electro-magnet is energized.

The metallic supporting framework, including the non-magnetic angle plate, constitutes a common ground for several of the established circuits, and in the diagrammatic view, therefore, this framework generally is designated by the conventional grounded connection 7ª, 15 designates an insulated make and break contact screw or post for the free end of the interrupter bar 12, the other end of which interrupter bar is pivoted at 16 to the vertical web of the aforesaid angle plate, while 17 designates a spring tensioned to press downwardly on the interrupter bar 12, but this spring may obviously be of any other suitable form to either press or pull downwardly on the interrupter bar. The interrupter bar 12 is formed with a detent 18 intermittently engaged by the star wheel 11 to cause a rapid vibration of the interrupter bar in conjunction with the retractile action of the spring 17.

19 designates a base insulation block, disposed adjacent the non-magnetic angle plate aforesaid, and on this base block is mounted the contact post 15 as well as an upwardly springing metal tongue 20, provided at its free end with a detent 21 coöperating with the toothed periphery of the star wheel 11 like one of the brushes for commutator segments, an electrical circuit being closed thereby when the detent 21 engages a tooth of the star wheel and opened when disposed between teeth, being in the latter position out of contact with the wheel.

It may not be amiss to briefly state at this point, and which will be enlarged upon later, that in this type of electrical testing devices, the employment of an electro-mechanical interrupter is believed to have decided improved advantages over a purely mechanically operated interrupter, which latter in turn also has its own advantages over an electrically operated vibrator serving as a circuit interrupter as has heretofore been in practice.

22 designates a knife switch pivoted at 23 and having two contacts 24 and 25. This switch may have a single blade or double blades as indicated, respectively, in Figs. 1 and 2.

26 represents a source of electrical energy, which may consist of a six volt storage battery or five or six good dry cells coupled in series, and 27 and 28 are the plus and minus binding posts, respectively, of the testing device connected with the cells 26.

29 designates a high tension spark coil, suspended from underneath the lid 6, and 30 and 31 indicate, respectively, the primary and secondary coils or windings thereof. One terminal of the primary winding is indicated at 32 and the high tension terminal of the secondary winding is indicated at 33, while the other ends of the said windings are joined together by a common terminal 34, as is done quite customarily in practice although not necessarily so.

35 designates a push button controlling a condenser 36, also suspended from underneath the lid 6 as hereinbefore mentioned, and 37 designates an upright block, of insulating material, having a V-shaped seat in its upper edge face, with a metallic pin 38 extending vertically therethrough to slightly project above the center of said seat and below the underneath face of the lid 6.

39 designates a spark gap post, conveniently termed the "main high tension gap post," and 40 designates a spark coil gap post which may be called the "secondary high tension gap post," while 41 designates a third gap post, commonly associated with both of the posts 39 and 40 and hereinafter referred to as the "common gap post." Each of the posts 39 and 40 have plug sockets 42 and 43, in their respective tops, and are likewise provided with fixed jump spark pins 44 and 45 associated, respectively, with movable jump spark pins 46 and 47, longitudinally adjustable by supporting screw spindles threaded at angles through the common gap post 41 and controlled by milled heads 48 and 49. The milled heads may be operated without danger of a shock during the excitation of the high tension spark coil 29 of the testing device, or for that matter the secondary or high tension winding of any device being tested, as the common gap post 41 is grounded as will hereinafter appear.

50 and 51 simply indicate the two jump spark gaps or spaces between the pins 44—46 and 45—47 respectively.

52 designates an upper metallic plate, mounted on top of the secondary high tension gap post 40, and 53 designates an associated base metallic plate on top of the lid 6, the two plates being disposed in inclined alinement and having curved seats 54 and 55 to receive the gap and porcelain ends, respectively, of spark plugs to be tested, for which tests these plates are primarily designed; but the base plate 53 is supplementally provided with a plug socket 56, making this terminal utilizable for other important tests as well, when proper circuits are established therethrough.

57 and 58 indicate plug socket terminals for a pair of testing connections, which may be a pair of insulated or corded wires designated at B and R, being respectively colored black and red for convenience in use, and these corded wires have a plug terminal at one of their ends and an attaching test clip at their other ends. There is also another detachable corded connection employed for making some tests, and although this connection is not shown on the drawings, it will be referred to in certain tests as the "high tension cable." It is likewise provided at one end with a plug terminal and at the other end with an attaching test clip.

In addition to the broad idea of the employment of an electro-mechanical circuit interrupter, as contradistinguished from the specific details thereof, the various features heretofore described generically (such as the high tension spark coil, condenser, V-block, spark gap posts, etc.) function in a distinctively improved manner, when viewed in the light of the novel combination of electrical circuits in which they are or may be included, and they all constitute important features of the present invention; but in order that their full advantages may appear more clearly, I will now describe specifically the wiring of the plurality of definite electrical circuits embodying the same, after which I will trace out these circuits in sequential order, and finally demonstrate several of the important tests, that may be accomplished by this unitary testing device, sufficient in number only, however, to serve as illustrations and not by any means including the greater number of tests that may be carried out by various selective applications of the test clips heretofore mentioned.

*Motor circuit.*—a is a lead from the plus terminal 27 to the pivotal post of the switch, and b is a lead from the minus terminal 28 to the metallic framework support, indicated as being grounded at 7ª through the conventional short connection c. d is a lead from the first switch contact 24 to the spring tongue 20, which line includes the coil of the electro-magnet 9, and e is a short connection simply designating conventionally the grounding of the arbor of the star wheel 11 through the metallic framework support ground 7ª. This establishes the rotor operating circuit when the switch is thrown only part way down to the first contact position or when thrown all of the way down to make both contacts 24 and 25.

*Main circuit.*—f is a lead also from the first switch contact 24 to the "black cord" test clip terminal 57, and g is a lead from the "red cord" test clip terminal 58 which is grounded to the metallic framework support through the post 15 and the circuit interrupter bar 12. Thus it will be noted that this main circuit includes the electro-mechanical circuit interrupter 12 as well as a device of unknown quantity being tested, when the terminals of the latter are coupled up with the black and red test clip connections B and R.

*Auxiliary circuit.*—h is a lead from the second switch contact 25 direct to one end 32 of the primary winding 30 of the high tension spark coil 29, and k—k' is a lead from the other terminal 34 thereof to the metallic framework ground through the post 15 and interrupter bar 12.

*High tension induced current circuit.*— It will be noted that the lead k of the auxiliary circuit is likewise connected at one end to one end (at the terminal 34) of the secondary winding 31 of the said spark coil, while there is also a branch connection l therefrom leading to the common gap post 41. The other end or high tension terminal 33, of the spark coil's secondary winding 31, is connected by the lead m to the secondary high tension gap post 40. This high tension induced current circuit includes the jump spark gap 51.

*Condenser circuit.*—The condenser 36 is normally included in multiple with (connected across) the electro-mechanical circuit interrupter, as is illustrated by the connection n, between the push button 35 and the lead k', the condenser contact o co-acting with the push button, and the condenser's grounded end connection p.

*Other main circuits.*—Supplementary to the aforesaid circuits, substantially complete in themselves, there are other main circuits, including the device to be tested, which are completed in some instances through a connection r between the V-block contact pin 38 and the main high tension gap post 39, and in other instances through a connection s from the base plate 53 to the grounded framework, the grounding thereof being indicated diagrammatically by the short connection c.

From the foregoing it will be observed that there may be established a plurality of definite electrical circuits encompassed by, or confined to, the improved testing device *per se*, while at the same time numerous main circuits may be established either with or without some of the definite circuits of the testing device, so as to include various electrical windings or devices to be tested, through the contact terminals 38, 39, 42, 43, 52, 53, 56, 57 and 58, by means of the proper attachment of the test clip connections B and R and the detachable high tension cable (not shown) in various combinations dependent upon the nature of the tests; but for brevity's sake I shall only describe a few of such important tests sufficient for illustrative purposes, it being understood that many other tests may be made with this unitary testing device as before stated.

*Testing high tension spark coils.*—The proper hook up for testing a spark coil will depend upon the type of coil, and whether or not it is combined with a condenser. Also, in some high tension spark coils the beginning of the secondary winding is connected to the primary winding; in other types it is connected to the frame or iron core of the coil, as in some Delco types; or to the metal base of coil, as in some Remy types.

In the following I shall only refer to a high tension spark coil, such as illustrated at 29 in the drawings, wherein the coil *per se* is not equipped with a condenser and in which the beginning of the secondary winding is connected, at 34, to one end of the primary winding. It will be understood, however, that tests of other types of coils may readily be made by the simple expedient of additionally hooking up properly a short length of copper wire, or a "jumper" connection, not necessary to describe with reference to the instant test; but in testing spark coils of whatever type it is always essential to cause the exciting current to traverse the primary winding.

Assuming, therefore, that we are testing a coil of unknown quantity, of the type shown at 29, then the test clip of the connection B should be attached to one end of the primary winding, the equivalent of 32, and the test clip of the connection R attached to the other end thereof, the equivalent of 34. Also, the test clip of the short high tension cable (not shown) should be attached to the free end of the secondary winding, or high tension terminal 33, and the plug at the other end of the high tension cable inserted in the plug terminal 42.

Under these conditions, with the switch thrown to the first contact position 24 the motor circuit would be closed, the battery exciting current traversing the line $a$, 23, 24, $d$, 9, 20, 21, 11 and $b$. This arrangement, therefore, causes the rapid vibration of the electro-mechanical interrupter 12, when the latter type of interrupter is employed in the testing device and which is preferable for the reasons herein appearing.

In addition to the motor circuit, a battery exciting current is also caused to traverse a main circuit line $a$, 23, 24, $f$, B, primary winding of the coil being tested, R, $g$, 15, 12 and $b$, and thus, including the interrupter 12, it is obvious that this current is an intermittent one, inducing a high tension current around the secondary winding, of the coil being tested, which flows from its high tension terminal (corresponding to 33) through the high tension cable (not shown) to the post 39, jumping the gap 50 to the common gap post 41, thence flowing through $l$, $k'$ and $g$ to the other end of the secondary winding, which end it will be recalled is joined to an adjacent end of the primary winding, as is indicated at 34 in the testing device coil. Thus the induced current circuit is completed and if the windings are in good shape sparking will occur at the gap 50 with an intensified jump. If not in good shape there will be very poor sparking or no sparking at all at the gap 50.

Also, the coil in this test not being directly equipped with its essential condenser, the condenser 36 of the testing device serves in its place, it being before explained that the condenser 36 is connected in multiple with or across the interrupter. However, should the coil being tested be equipped with its own contained condenser, it is obvious that by pressing down the push button 35 the condenser 36 will cease to function, and thus if good sparking still occurs at the gap 50 it will indicate that the coil condenser is all right also.

*Testing non-combined condensers.*—Before demonstrating the preferred method of this test, it may be noted, from the latter part of the preceding test, that the terminals of the condenser (combined with the coil) were in fact actually coupled up with the test clip connections B and R (which latter engaged the ends of the primary winding) because where condensers are directly combined with such coils the terminals of the condenser are connected with the ends of the primary winding. It follows, therefore, that independent condensers may likewise be tested, through connections with the B and R test clips, by throwing the switch to the second contact position 25, whereby the condenser 36 as well as the condenser being tested are then associated with the spark coil 29 of the testing device, the circuit of the spark coil 29, or the aforementioned "auxiliary circuit," including the interrupter 12 when the switch is thrown to the second contact position. In that event, however, the circuit of the condenser being tested, across the interrupter, is made through the batteries 26 and their connections. A satisfactory test of large condensers may accordingly be made in this way, but where the condenser, to be tested, is of small capacity, the loss in capacity around this lengthened circuit might result in very weak sparking only at the gap 51. It is decidedly preferable, therefore, to test non-combined condensers generally by another circuit.

To make the preferred test the R test clip is connected to one end or terminal of the condenser while the other terminal thereof may be held directly up against the metal base plate 53, although in some instances it may be found expedient to make this latter connection by means of the high tension cable (not shown) by attaching its clip to the condenser terminal and plugging the other end in the socket 56. One terminal of the unknown condenser will then be grounded through the connection $s$ while its other end will be in circuit with the lead $k'$, being thus thrown across the interrupter in exactly the same relation as the condenser 36.

Upon the switch being operated into the double contact positions 24—25 the motor circuit will be closed, as before described, as well as the aforesaid auxiliary circuit, the current through the latter flowing by way of $a$, 25, $h$, 32, 30, 34, $k$, $k'$, 15, 12 and $b$. A high tension current will thereby be induced in the secondary winding 31 and will flow by way of the secondary's terminal 33, $m$, 40, 41, *l*, *k* and back to the other end of the secondary winding at 34, having jumped the gap 51 and thus completing the induced current circuit of the auxiliary circuit.

Even though the unknown condenser is not coupled up, sparking will nevertheless occur at the gap 51, as long as the circuit of the condenser 36 is closed, but in such a case the sparking will cease when the push button 35 is operated. If the unknown condenser is coupled up then both condensers will be connected across the interrupter and the sparking at 51 will necessarily be intensified if the unknown condenser is in good condition. By now pressing down on the push button 35, the condenser 36 is put out of commission and the unknown quantity of the condenser being tested will be positively indicated by the sparking at the gap 51. There are several ways in which this test is established, either by sparking or non-sparking at the gap 51 or by arcing at the interrupter contact points, dependent upon the size and capacity of the unknown condenser and its good or faulty condition; but an enumeration of these details would serve no useful purpose herein, and likewise it would be undesirable to involve the specification by a lengthy discussion of the various types of condensers that may be tested, the simple test disclosed sufficing for illustrative purposes.

*Testing spark plugs.*—Support the spark plug with the insulated terminal thereof resting on the curved seat of the metal base plate 53 and with its spark gap end resting on the curved seat of the upper metal plate 52. Upon the switch being now closed down into both first and second positions 24—25, the motor circuit and the auxiliary circuit will both be closed as heretofore described, and the induced high tension current around the secondary winding of the spark coil 29 will flow through *m* to the gap post 40, jumping the narrower gap space of the spark plug in preference to the wider one 51 (it being understood that the threaded pin 47 is to be adjusted to that end) and thence passing through the spark plug to the base plate 53 its circuit will at least be completed by virtue of the line *s*, *b*, batteries, *a*, switch, *h*, 32, 30 and the other end of the secondary winding at 34. Obviously in this test the condition of the spark plug will be established by sparking, or non-sparking, between the points of the spark plug itself.

*Testing high tension magneto armatures, one-spark type.*—These armatures combine a high tension coil and a condenser in contained relation, one end of the primary winding being grounded to the armature core, which is in electrical connection with the projecting end of the armature shaft, while the other terminal of the primary winding is disposed in insulated relation to said shaft end and core. The condenser being connected at its ends with the complementary ends of the primary winding, the same as in coil condensers, it follows that the condenser terminals are likewise respectively grounded and insulated. Also, in the single spark type of said high tension magneto armatures one end of the secondary winding is grounded to the core, by its connection with the grounded end of said primary winding, while the high tension terminal of said secondary winding is in electrical connection with the collector ring of the armature, which collector ring is mounted in insulated relation to the core and projecting shaft end. In a two-spark type, however, neither end of the secondary winding is connected to the primary winding and core, and hence would require another form of test, but it will be understood that the instant test being disclosed relates only to the single spark type.

It may be noted that this test is practically identical with that for a coil (containing a condenser) as before described; but in this armature test the high tension terminal of the secondary winding is not accessible for the direct attachment of a test clip, and hence the V-block and connection *r* are substituted for the detachable high tension cable.

In making the test, the collector of the armature is seated in the recess 37 of the V-block with its metal ring in contact with the terminal pin 38. If now the test clip connections B and R are respectively attached with either of the ends of the primary winding a main circuit will be established, by way of the interrupter 12, when the switch is thrown into the first contact position 24. At the same time an induced high tension current circuit is established through the secondary winding. As a specific illustration, the B test clip is suitably connected to the insulated terminal of the primary winding and the R test clip to the projecting shaft end of the armature being tested. Then, in addition to the motor circuit being closed, the current of the main circuit flows by way of *a*, 24, *f* and B to the combined insulated terminal of the primary winding and condenser of the armature, thence around the primary winding thereof to the combined grounded terminal with the core, thence through core and shaft to the R test clip connection, and finally to the minus pole of the exciting battery by way of *g*, *k'*, 15, 12 and *b*. The induced current, flowing in the reverse direction, will leave one end of the secondary winding at its terminal connection with the metal ring of the armature collector, and thence flowing, by way of 38, *r*, 39, jumping the gap 50, 41, *l*, *k'* and *g*, to the R test clip connection, it will finally complete its circuit by way of the armature shaft, core and grounded end of the primary winding, to which latter the other end of the secondary winding is connected as before stated.

If the collector and the primary and secondary windings of the armature are in good condition there should be an intensified sparking at the gap 50, and if the condenser of the armature is likewise in good condition, then sparking at the gap 50 should also occur when the push button 35 is depressed to cut out the condenser 36 of the testing device, it being observed that the condenser of the armature is also thrown across the interrupter 12, although in this case the armature condenser circuit is by the roundabout way through the battery.

If sparking does not occur at all at the gap 50, or if it will not jump a gap of more than one-eighth of an inch, it is evidence that there is some leakage or other fault in the windings or collector ring; but if proper sparking does occur before operating the push button 35 and does not when the push button is pressed down, then there is a faulty armature condenser. Also it may be said that this particular test is mainly directed to the magneto armature as a whole, and if sparking does not occur at all it would then be necessary to test the coil and condenser separately from the collector ring, as heretofore explained with reference to other tests, and if that test proves satisfactory it will be obvious that it is the collector ring which is defective.

It is believed that the importance of the general details thus far disclosed will be obvious, including the high tension spark coil embodied in the auxiliary interrupter circuit of the testing device, the V-block, the spark plug supporting test terminals and the arrangement of the spark gap posts in the novel combination of circuits, as well as the feature of having the condenser 36 normally connected in multiple across the interrupter. It only remains, therefore, to emphasize the special utility and improvement in employing an electro-mechanical circuit interrupter, as distinguished from a manually operated interrupter or an electro-magnetic vibrator as heretofore employed in analogous relations.

A purely mechanical circuit interrupter has certain advantages over an electro-magnetic vibrator, in testing devices of this character. The intensity of the high tension induced current largely depends upon the amperage through the primary of the spark coil, and this flow is somewhat controlled by the springiness of the interrupter element. If the circuit interrupter be an electromagnetic vibrator, then the maximum amperage through the primary winding, and hence an intensified sparking at the gaps, would be obtained with a very stiffly tensioned vibrator; but for the best results this tension would be so stiff as to seriously interfere with the proper functioning of the vibrator, owing to the insufficiency of magnetic attraction by its armature core. While this objection is overcome by the use of a mechanical interrupter, there still remains a deficiency in the latter type as it must be operated manually in a portable testing device, and the tests made, therefore, are more or less of short duration, and necessitate personal attendance during the whole testing period.

With the improved electro-mechanical circuit interrupter as disclosed herein, however, the motor drive provides for continuous tests of extended duration and without the necessity of personal attendance excepting for observations, which in many instances is found to be extremely desirable. At the same time it has all of the advantages of a purely mechanical interrupter over that of an electro-magnetic vibrator.

While I have thus made a full and complete disclosure of a practical embodiment of my improvements, it will be understood that minor changes may be made in the form and structural arrangement of elements without departing from the invention, and I do not necessarily limit myself, therefore, to the exact details as illustrated and described, excepting as they may come within the purview of the ensuing claims, when fairly interpreted in the light of the specification and understood equivalents.

What I claim, as new and patentable, is:—

1. An electrical testing device of the character set forth embodying a switch connected with one pole of electrical exciting means; a circuit interrupter and means for actuating the same; a circuit line adapted to include the primary winding of an induction coil, said switch, said interrupter and the other pole of said exciting means; a high tension circuit line adapted to include the secondary winding of said induction coil; test indicating means disposed in said high tension line; test terminals for said circuit lines; and a condenser circuit line including regulable means connecting its condenser across said interrupter, substantially as described.

2. An electrical testing device of the character set forth embodying a switch connected with one pole of electrical exciting means; a circuit interrupter and means for actuating the same; a circuit line adapted to include the primary winding of an induction coil, said switch, said interrupter and the other pole of said exciting means; a high tension circuit line adapted to include the secondary winding of said induction coil; test indicating means disposed in said high tension line; test terminals for said circuit lines; a condenser normally connected across said interrupter; and means included in said condenser's circuit for cutting out the latter as desired, substantially as described.

3. An electrical testing device of the character set forth embodying a switch disposed in circuit with electrical exciting means; an electro-mechanical circuit interrupter; a high tension circuit line controlled by said interrupter and including test terminals and test indicating means; a motor circuit line disposed in circuit with said exciting means and switch; a rotor operable upon the closing of said motor circuit; and mechanical means operable by said rotor for actuating said interrupter, substantially as described.

4. An electrical testing device of the character set forth embodying a switch connected with one pole of electrical exciting means; an electro-mechanical circuit interrupter; a circuit line adapted to include the primary winding of an induction coil, said switch, said interrupter and the other pole of said exciting means; a high tension circuit line adapted to include the secondary winding of said induction coil; test indicating means disposed in said high tension line; test terminals for said circuit lines; a condenser circuit line including regulable means connecting its condenser across said interrupter; a motor circuit line disposed in circuit with said switch and said exciting means; a rotor operable upon the closing of said motor circuit; and mechanical means operable by said rotor for actuating said interrupter, substantially as described.

5. An electrical testing device of the character set forth embodying a switch connected with one pole of electrical exciting means; a circuit interrupter and means for actuating the same; a circuit line adapted to include the primary winding of an induction coil, said switch, said interrupter and the other pole of said exciting means; a high tension circuit line adapted to include the secondary winding of said induction coil; gap elements disposed in said high tension line providing for sparking thereacross; test terminals for said circuit lines; a condenser normally connected across said interrupter; and means included in said condenser's circuit for cutting out the latter as desired, substantially as described.

6. An electrical testing device of the character set forth embodying a switch connected with one pole of electrical exciting means; an electro-mechanical circuit interrupter; a circuit line adapted to include the primary winding of an induction coil, said switch, said interrupter and the other pole of said exciting means; a high tension circuit line adapted to include the secondary winding of said induction coil; gap elements disposed in said high tension line providing for sparking thereacross; test terminals for said circuit lines; a condenser circuit line including regulable means connecting its condenser across said interrupter; a motor circuit line disposed in circuit with said switch and said exciting means; a rotor operable upon the closing of said motor circuit; and mechanical means operable by said rotor for actuating said interrupter, substantially as described.

7. An electrical testing device of the character set forth embodying a switch connected with one pole of electrical exciting means; a circuit interrupter and means for actuating the same; a high tension gap element and electrical conducting means for connecting same to one end of the secondary winding of an induction coil; a second gap element and electrical conducting means for connecting same to the other end of said secondary winding, said gap elements being so disposed in circuit as to provide for sparking thereacross; a circuit line adapted to include the primary winding of said induction coil, said switch, said interrupter and the other pole of said exciting means; and a condenser circuit line adapted to include a condenser connected across said interrupter, substantially as described.

8. An electrical testing device of the character set forth embodying a circuit interrupter with means for actuating the same; a switch; a circuit line established to include a source of electrical energy, said switch, said interrupter and the primary winding of an induction coil; a high tension gap post having a plug socket terminal and electrical conducting means for connecting said post to one end of the secondary winding of said induction coil; a second gap post and electrical conducting means for connecting same to the other end of said secondary winding, said gap posts being so disposed in circuit as to provide for sparking thereacross; and a condenser circuit line established to include a condenser connected across said interrupter, substantially as described.

9. An electrical testing device of the character set forth embodying a circuit interrupter with means for actuating the same; a switch; a high tension spark coil; a circuit line including a source of electrical energy, said switch, said interrupter and the primary winding of said spark coil; a high tension gap element electrically connected to one end of the secondary winding of said spark coil; an associated metallic element in electrical connection with the other end thereof, the said two elements providing a gap in their circuit adapted to be approximately closed by opposed jump spark pins; and a condenser circuit line established to include a condenser connected across said interrupter, substantially as described.

10. An electrical testing device of the character set forth embodying a circuit interrupter with means for actuating the same, one end of said interrupter being grounded; a switch; a high tension spark coil; a circuit line including a source of electrical energy, said switch, said interrupter and the primary winding of said spark coil; a high tension gap post connected to one end of the secondary winding of said coil and having an upper terminal support; a lower terminal support spaced therefrom and in electrical connection with the second end of said secondary winding as well as with the grounded end of said interrupter; a test clip connection in line with the other end of said interrupter; a second gap post in electrical connection with said second end of said secondary winding; and a condenser circuit line established to include a condenser connected across said interrupter; the said terminal supports functioning as contact seats in spark plug tests while said lower support also serves as a terminal co-acting with said test clip connection in separate condenser tests, substantially as described.

11. An electrical testing device of the character set forth embodying a circuit interrupter, grounded at one end, with means for actuating the same; a switch having two contact positions associated with a source of electrical energy; a high tension spark coil; a main gap post; a secondary gap post; electrical conducting means for separately connecting said main and secondary gap posts to one of the ends of the secondary winding, respectively, of an induction coil to be tested and the aforesaid spark coil; a co-acting common gap post and electrical conducting means for connecting the same with the other ends of the secondary windings of both of said coils; a condenser circuit line including regulable means connecting its condenser across said interrupter; a metallic terminal in line with the grounded end of said interrupter; a testing connection in line with the other end of said interrupter; a testing connection in line with the first contact position of said switch, the said testing connections being adapted for establishing a circuit line through the primary winding of said induction coil, or through other electrical elements being tested as desired; and a circuit line through the second contact position of said switch and including said interrupter and the primary winding of said testing device's spark coil, substantially as described.

12. An electrical testing device of the character set forth embodying a circuit interrupter with means for actuating the same; a switch; a circuit line established to include a source of electrical energy, said switch, said interrupter and the primary winding of an induction coil; a high tension gap element adapted for attachment to one end of an electrical conductor leading to one end of the secondary winding of said induction coil; an insulated block having a recessed seat in its upper edge face with a projecting contact pin electrically connected to said high tension gap element; a second gap element and electrical conducting means for connecting same to the other end of said secondary winding, said gap elements being so disposed in circuit as to provide for sparking thereacross; and a condenser circuit line including regulable means connecting its condenser across said interrupter, substantially as described.

13. An electrical testing device of the character set forth embodying a vibratory circuit interrupter pivoted and grounded at one end and at its free end associated with an insulated contact post; means for actuating said interrupter; a switch having two contact positions connected to a grounded electrical source; a high tension spark coil; a conductor line between said interrupter post and one end of both primary and secondary coil windings; a conductor line between the other end of said primary winding and said switch's second position; a main gap post having a plug socket; an insulated V-block having a contact pin connected to said main gap post; a secondary gap post connected to the other end of said secondary winding and having an upper terminal support; a grounded lower terminal support spaced therefrom and having a plug socket; a co-acting common gap post connected to the conductor line between said interrupter post and said coil's windings; a testing connection in line with said interrupter post; a testing connection in line with the first contact position of said switch; and a condenser circuit line including regulable means connecting its condenser across said interrupter, the respective elements functioning, when an electrical part to be tested is included in circuit, substantially as described.

14. An electrical testing device of the character set forth embodying an electro-mechanical vibratory circuit interrupter grounded at its pivoted end and at its free end associated with an insulated contact post; a switch having two contact positions connected to a grounded electrical source; a motor circuit line disposed in circuit with said electrical source through said switch; a rotor operable upon the closing of said motor circuit; mechanical means operable by said rotor for actuating said interrupter; a high tension spark coil; a conductor line between said interrupter post and one end of both primary and secondary coil windings; a conductor line between the other end of said primary winding and said switch's second position; a main gap post adapted for connection with an electrical part to be tested; a secondary gap post connected to the other end of said secondary winding; testing terminals coöperating with said main and secondary gap posts; a co-acting common gap post connected to the conductor line between said interrupter post and said coil's windings; a testing connection in line with said interrupter post; a testing connection in line with the first contact position of said switch; and a condenser circuit including regulable means connecting its condenser across said interrupter, substantially as described.

In testimony whereof I affix my signature.

RICHARD C. BIERBOWER.